(12) United States Patent
Yang

(10) Patent No.: US 8,195,624 B2
(45) Date of Patent: Jun. 5, 2012

(54) SHARED FILE SYSTEM MANAGEMENT BETWEEN INDEPENDENT OPERATING SYSTEMS

(75) Inventor: Chiang Han Yang, Sunnyvale, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 243 days.

(21) Appl. No.: 11/480,167

(22) Filed: Jun. 29, 2006

(65) Prior Publication Data
US 2007/0005661 A1    Jan. 4, 2007

Related U.S. Application Data

(60) Provisional application No. 60/695,930, filed on Jun. 30, 2005.

(51) Int. Cl.
*G06F 7/00* (2006.01)
*G06F 17/00* (2006.01)
(52) U.S. Cl. .................. 707/687; 707/704; 707/705
(58) Field of Classification Search .............. 707/8, 687, 707/704
See application file for complete search history.

(56) References Cited

U.S. PATENT DOCUMENTS

| | | | |
|---|---|---|---|
| 6,173,293 B1 * | 1/2001 | Thekkath et al. | 707/201 |
| 6,230,190 B1 * | 5/2001 | Edmonds et al. | 709/213 |
| 6,314,501 B1 * | 11/2001 | Gulick et al. | 711/153 |
| 6,412,079 B1 * | 6/2002 | Edmonds et al. | 714/11 |
| 6,526,574 B1 * | 2/2003 | Jones | 717/168 |
| 7,337,171 B2 * | 2/2008 | Gimpl et al. | 707/8 |
| 7,353,240 B1 * | 4/2008 | Takamoto et al. | 1/1 |
| 2001/0032257 A1 * | 10/2001 | Wells et al. | 709/223 |
| 2004/0267835 A1 * | 12/2004 | Zwilling et al. | 707/202 |
| 2005/0240773 A1 * | 10/2005 | Hilbert et al. | 713/182 |
| 2006/0010450 A1 * | 1/2006 | Culter | 718/104 |
| 2006/0080397 A1 * | 4/2006 | Chene et al. | 709/213 |

OTHER PUBLICATIONS

International Search Report and Written Opinion in PCT/US06/25497 dated Jul. 7, 2008, (10 pages).

* cited by examiner

*Primary Examiner* — Apu Mofiz
*Assistant Examiner* — Jared Bibbee
(74) *Attorney, Agent, or Firm* — Brokaw Patent Law PC; Christopher J Brokaw

(57) ABSTRACT

A shared file system may be updated by a non-native operating system writing information to a change file, while a native operating system is in a suspend or hibernation mode; after writing, the non-native operating system is placed in a suspend or hibernation mode and the native system activates and then retrieves the updated information from the change file and writes the updated information to a shared file system. The native operating system returns to a suspend or hibernate state before the non-native operating resumes operation. The updated information may be written as provided by the non-native operating system, or further updated by the native operating system before being written to the shared file system. The change file is created by the native operating system, and may be a reserved portion of the shared file system or may be a separate portion of non-volatile memory. The native and non-native operating systems operate both concurrently and independent of one another; thereby, preventing conflicts during file system updating.

15 Claims, 4 Drawing Sheets

SHARED FILE SYSTEM MANAGEMENT BETWEEN INDEPENDENT OPERATING SYSTEMS

This application claims the benefit of U.S. Provisional Application Ser. No. 60/695,930, filed Jun. 30, 2005.

FIELD OF THE INVENTION

The present invention generally relates to file system management and, more particularly, to managing a shared file system between two or more independent operating systems.

BACKGROUND OF THE INVENTION

File systems are employed by operating systems to define, organize and maintain the contents of a particular file or series of files present in a corresponding memory. A hierarchical file system is an exemplary file system type that employs directories to organize files in a tree structure. A shared file system, in corresponding fashion, defines, organizes and manages the contents of files that are to be accessed and/or modified by two or more operating systems, for example, Linux and Windows.

One drawback associated with typical shared file system implementations is that the operating systems that access the shared file system have to be the same. This is the result of current operating systems employing proprietary file system structures and access protocols. As such, it is currently not possible for a first operating system to access the same file system and share or otherwise update files contained within a memory managed by a second operating system, if the first and second operating systems are different, as it will be the file system of the second operating system that controls the access and organization of the underlying memory.

SUMMARY OF THE INVENTION

A method for managing the sharing and updating of information contained within a shared file system that is accessible by two or more independent operating systems includes first creating a change file. This is performed, for example, by the operating system having principal control over the file system reserving an area of non-volatile memory for the writing and storage of information. This reserve area may be a portion of the file system itself, or a separate portion of non-volatile memory. Next, updated information, including the file name, location offset information, and updated data is written to the change file. The updated information may be provided, for example, by an application running on an operating system that does not have principal control over the shared file system. For example, in a system or platform executing both the Linux and Windows operating systems, Windows is typically the operating system that has principal control over the file system; whereas, Linux does not have control over the file system. Then, the updated information present in the change file is written to the shared file system. This may be accomplished, for example, by placing the secondary operating system (e.g. the operating system that does not have principal control over the shared file system) into a suspend or hibernate mode, activating the operating system having principal control over the shared file system, and having the principal operating system retrieve the file identified by the file name and offset information and modifying the contents of such file as provided in the data portion of the updated information and storing the updated file information in the shared file system In this manner, the principal and non-principal or secondary operating systems operate both concurrently and independently of one another; thereby, preventing conflicts during file system updating.

An electronic device includes a processor and a memory that is coupled to the processor. An exemplary memory includes a non-volatile memory, for example, a read only memory (ROM), a non-volatile random access memory (NVRAM), a hard disk or a ROM BIOS. The memory may form part of the particular electronic device, or may be one of several memories that are coupled to the processor over a network. The memory includes a shared file system that defines, organizes and manages the contents of files that are accessed and/or modified by two or more operating systems that independently execute on the electronic device. The memory also includes a principal or native operating system that has control over the shared file system and a secondary or non-native operating system that does not have control over the shared operations.

The memory also includes instructions that when executed by the processor, causes the processor to create a change file memory location. This may be, for example, a reserved area of the shared file system that is created, as part of a background commit process, during the start up period of the native operating system and continues to run invisible to the user until the native operating system shuts down or is otherwise placed in a suspend or hibernate state. The native operating system associates the change file memory location with a file name and a given address or location within the non-volatile memory. Next, updated information is written to the change file memory location. This is accomplished, for example, by the non-native operating system writing data (which may be modified or updated) to a file having a particular name and a corresponding offset. Next, the updated information from the change file memory is retrieved by the native operating system, which subsequently updates the corresponding information by retrieving the file at the offset indicated in the updated information and modifying the date within the file as presented in the data portion of the updated information.

An advantage provided by the present invention is that is allows for two or more independent operating systems to share the management of a shared file system transparently without having to reset the file system data structure or rebooting either of the concurrently running operating systems.

Another advantage provided by the present invention is that substantially reduces or eliminates conflict between two or more operating systems that write information to a shared file system.

BRIEF DESECRIPTION OF THE DRAWINGS

The present invention and the advantages and features provided thereby will be best appreciated and understood upon review of the following detailed description of the invention, taken in conjunction with the following drawings, where like numerals represent like elements, in which.

DETAILED DESCRIPTION OF THE INVENTION

Figure 1:
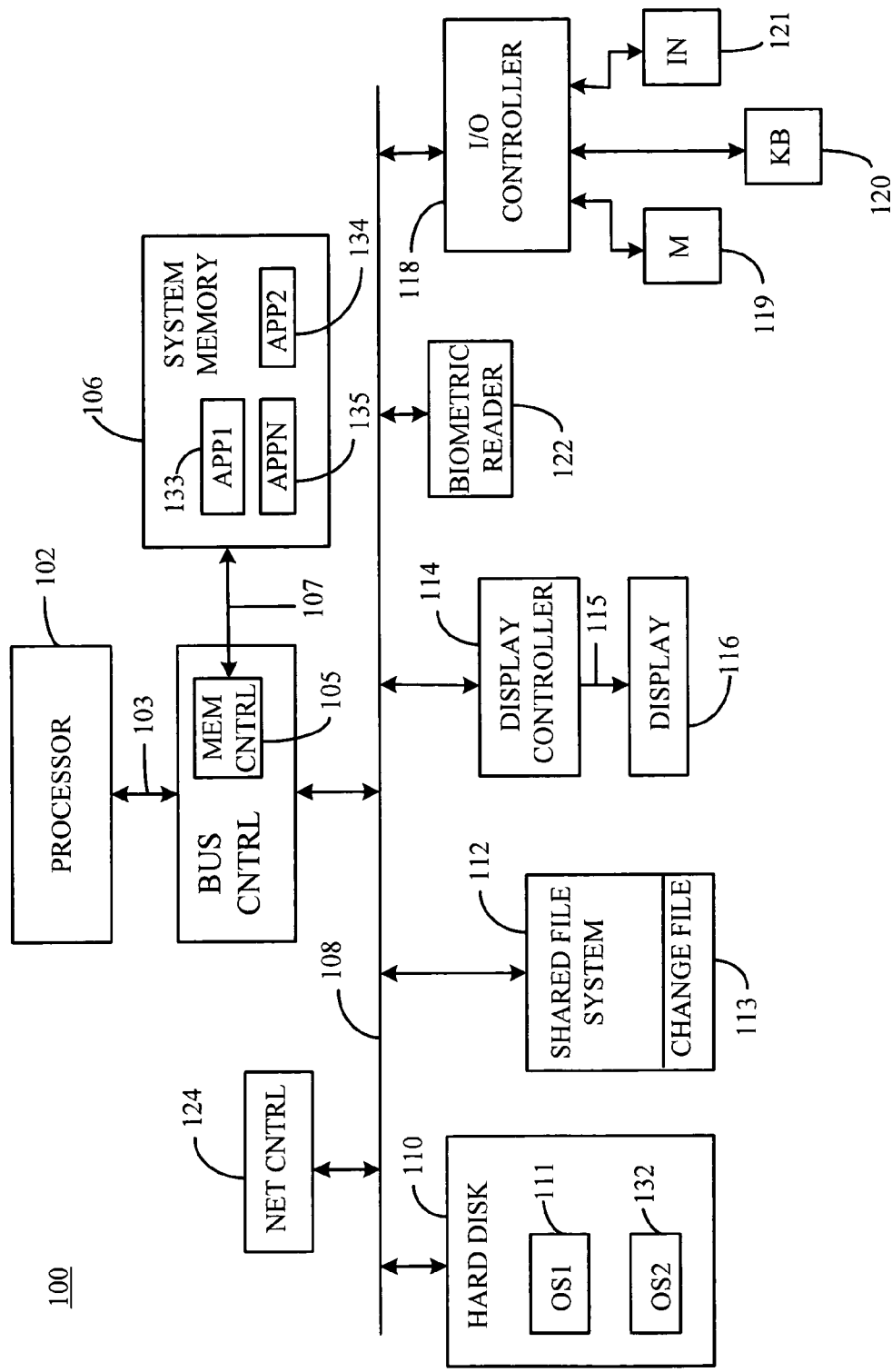
FIG. 1 is a schematic block diagram of an exemplary electronic device configured to implement the shared file system management functionality of the present invention.

An exemplary embodiment of the present invention will now be described with reference to FIGS. 1-4. FIG. 1 is a schematic block diagram of an exemplary electronic device 100, for example, a desktop computer, a laptop computer, a palm top computer, a router or set-top box, a server, a personal digital assistant (PDA), a communication device, for example, a cellular telephone or other suitable device and combination thereof, configured to implement the shared file system management functionality of the present invention. For purposes of illustration, and not limitation, the electronic device 100 is implemented as a laptop computer.

The laptop computer 100 includes a processor 102 configured to control the overall operation of the device. The processor 102 may include an arithmetic logic unit (ALU) for performing computations, one or more registers for temporary storage of data and instructions, and a controller for controlling the operations of the laptop computer 100. In one embodiment, the processor 102 includes any one of the Celeron™ and Centrino™ microprocessors manufactured by Intel Corporation, or the Power PC™ or other suitable processor marketed by International Business Machines. In addition, any of a variety of other processors, including those from Sun Microsystems, NEC, Cyrix and others may be used for implementing the processor 102. The processor 102 is not limited to microprocessors, but may take on other forms such as microcontrollers, digital signal processors (DSP), dedicated hardware (e.g. ASIC), state machines or software executing on one or more processors distributed across a network.

The processor 102 is coupled to a bus controller 104 by way of a central processing unit (CPU) bus 103. The bus controller 104 includes a memory controller 105 integrated therein. The memory controller 105 provides for access by the processor 102 or other devices to system memory 106, for example, random access memory (RAM) or other fast access memory device. The bus controller 104 is coupled to a system bus 108, for example, a peripheral component interconnect (PCI) bus, industry standard architecture (ISA) bus, universal serial bus (USB), a wireless connection or other suitable communication medium. Coupled to the system bus 108 is a non-volatile memory 110, for example, a read only memory (ROM), a non-volatile random access memory (NVRAM), a hard disk, a ROM BIOS for maintaining a native operating system, for example the Windows™ XP operating system 131 and a non-native operating system, for example, Linux 111; a display controller 114, operative to transfer data 115 for display on a corresponding display device 116, a biometric reader 122, an input/output (I/O) controller 118 and a network controller.124, for example, a wireless network controller.

When implemented in software, the elements of the present invention are essentially the code segments to perform the necessary tasks. The program or code segments can be stored, for example, in a processor readable medium or transmitted by a computer data signal embodied in a carrier wave over a transmission medium or communication link that can be accessed, for example, by the network controller 124. The processor readable medium may include, for example, an electronic circuit, a semiconductor memory device, a ROM, RAM, a flash memory, an erasable ROM (EROM), a floppy diskette, a CD-ROM, an optical disk, a hard disk, a fiber optic medium, a radio frequency (RF) link or any suitable medium or combination thereof. The computer data signal may include any signal that can propagate over a transmission medium, for example, electronic network channels, optical fibers, air, electromagnetic, RF links or any other suitable medium or combination thereof. The code segments may be downloaded via computer networks, for example, the Internet, LAN, WAN or any suitable network or combination thereof.

A shared file system 112, including a change file 113 of the present invention is shown. The shared file system 112 organizes and manages the contents of files that are to be accessed and/or modified by two or more independent operating systems, for example, Linux and Windows. The shared file system 112 may be a reserved area of the non-volatile memory 110 or may be a portion of a separate memory. The change file 113 may be a reserved area of the shared file system 112 or may be a portion of a separate memory accessible by both the native operating system 131 and the non-native operating system 111. The change file 113 has a fixed size, for example, between 500 Kbytes and 1 GByte to promote ease of writing of new or updated information.

As used herein, the native operating system 131 is the operating system that has principal control over the shared file system 112. With such control, the native operating system 131, and the corresponding applications that are running under its control, have the ability to write directly to the shared file system 112. In application, the native operating system 131 is operative only during those periods when the non-native operating system 111 is in a suspend, hibernate or other non-active or non-operative state. The native operating system 131 may include a background commit process 132, which is code and/or instructions that is capable of creating the change file 113 during start up of the laptop computer 100. The background commit process 132 is invisible to the user and continues to run until the native operating system 131 shuts down.

The non-native operating system 111 does not have principal control over the shared file system 112. Thus, any information to be provided to the shared file system 112 or any data or information maintained in the shared file system 112 that needs to be modified must be accomplished through other avenues. The non-native operating system 111 is operative only during those periods when the native operating system is 131 in a suspend, hibernate or other non-operating or non-active state. The non-native operating system 111 includes a virtual file system driver 117 (FIG. 2) that is capable of providing information to the change file 113, in a format that allows the native operating system 131 to easily access and make changes to the identified file as discussed with respect to FIGS. 2 and 3.

The display controller 114 may be implemented by any suitable device, for example, a graphics processor, capable of formatting digital data 115 for proper display and viewing on a corresponding display device 116, for example, a flat panel display, CRT display, printer, plotter or other suitable presentation device and combinations thereof.

The I/O controller 118 may be implemented by any suitable device capable of transferring information, for example, signals containing data and/or instructions between the processor 102 and a variety of input and/or output devices including, but not limited to, a mouse 119, keyboard 120, and pen input device 121. The pen input 121 may be implemented as a touch screen, soft keys, optical input device or other suitable input devices or combinations thereof.

The biometric reader 122 is a security device that is configured to read biometric information, for example, finger prints, retina information, or other suitable information from the user to determine whether the user is authorized to access and use the laptop computer 100. Biometric readers are just one type of security device or technique that may be employed by the laptop computer 100.

The network controller 124 maybe implemented, for example, by a wireless network access controller or other suitable device or applicable software capable of connecting the underlying laptop computer 100 to a larger network, for example, the Internet.

Figure 2:
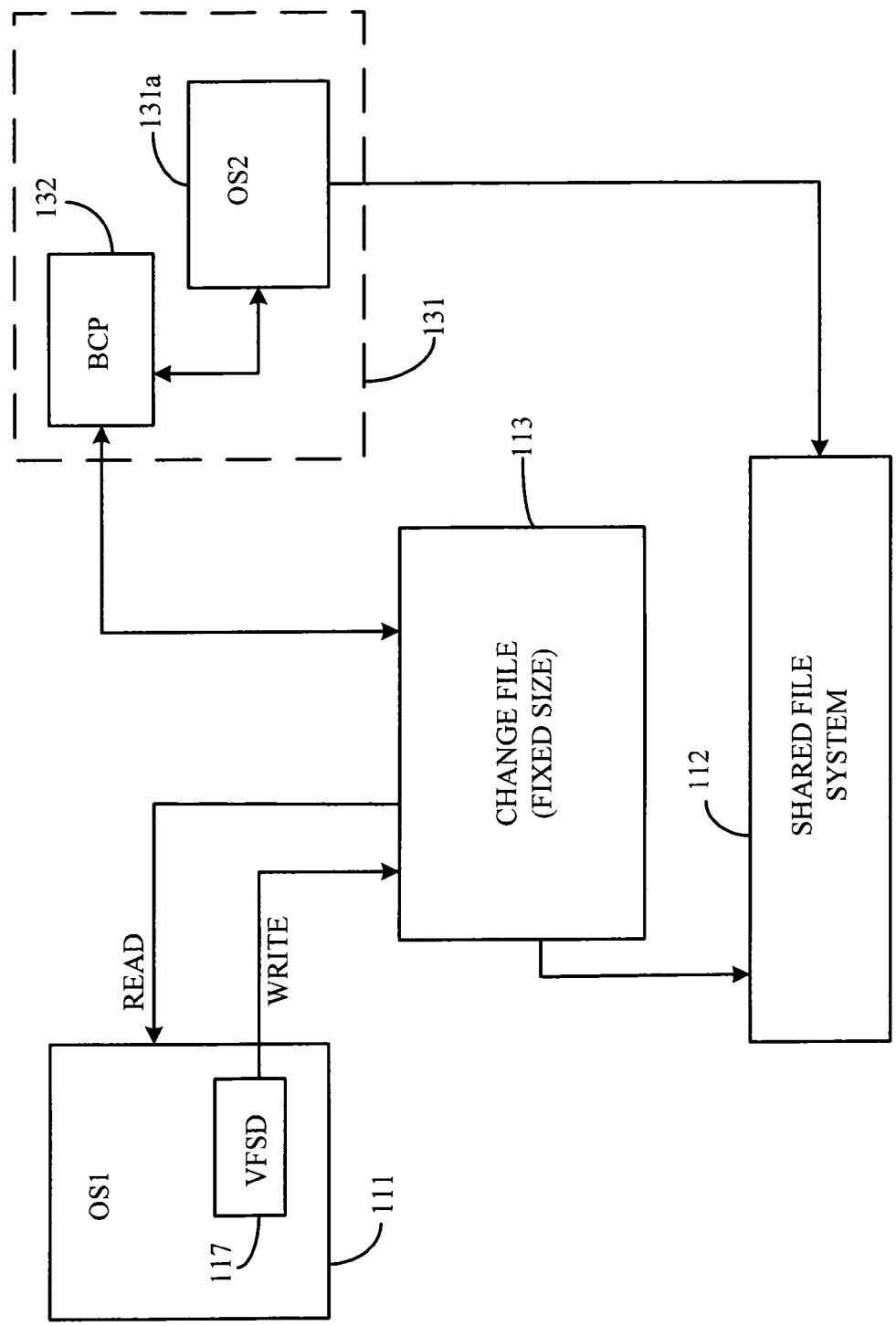
FIG. 2 is a logical representation of the components of the electronic device that implement the shared file system management functionality of the present invention.

FIG. 2 is a logical representation of the components of the electronic device 100 that implement the shared file system management functionality of the present invention. As shown, the non-native operating system 111 includes a virtual file system driver 117 that functions as an abstraction layer that virtualizes or otherwise converts the changes made to a particular file by an application running under the non-native operating system 111 or the non-native operating system 111 itself into a format recognizable by the native operating system 131. For example, the virtual file system driver 117 converts or maps the changes to a particular file (e.g. a text file) made by the Linux operating system application to a format recognizable by the Windows operating system by passing at least the following parameters to the change file 113: <file name>, <location offset> and <new, updated or modified data>, where <file name> represents the name of the particular new or changed (e.g. modified) file; <location offset> represents the location from the start of the file name that the changes take place; and <data> represents the new file or the file information that has been changed or otherwise altered.

Once the new of updated information is written to the change file 113 by the virtual file system driver 117, the non-native operating system 111 is placed or enters into a suspend or hibernate state, the native operating system 131 is made active, for example, the laptop computer 100 providing a corresponding resume or other suitable instruction to the controller portion of the processor, and the information is written to the shared file by the background commit process 132, retrieving the information from the change file 113 and writing the same to the shared file system though the native operating system 131a, as the native operating system has control over the shared file system. Once updating is complete, the native operating system 131 may remain active, or may be placed in a suspend or hibernate state through the issuance and receipt of a corresponding control signal. In this manner, the native and non-native operating systems operate both concurrently and independent of one another; thereby, preventing conflicts during file system updating.

Figure 3:
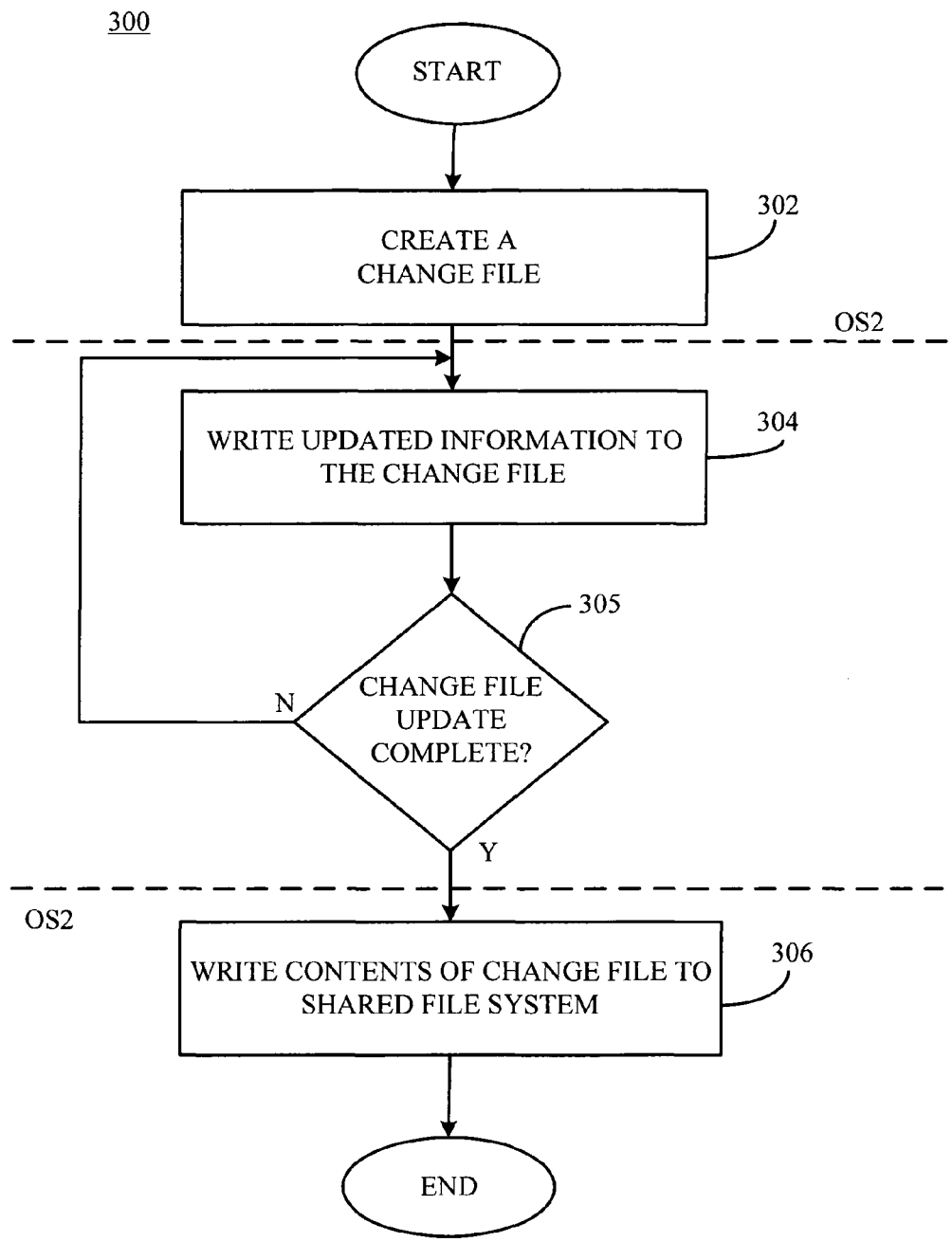
FIG. 3 is a flow chart illustrating the operations performed by the exemplary electronic device when implementing the shared file system management functionality of the present invention.
Figure 4:
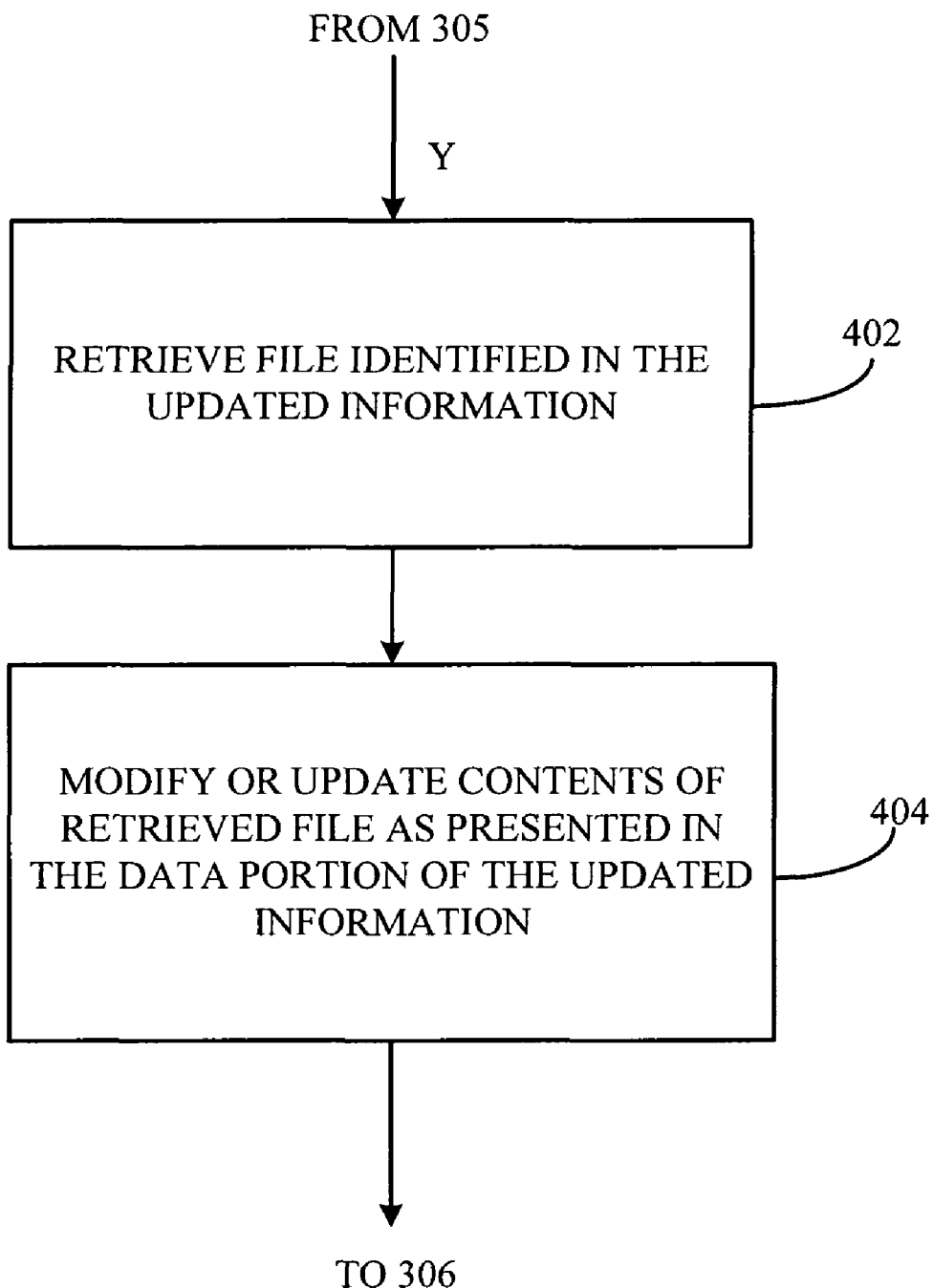
FIG. 4 is a flow chart illustrating how the updated file information is written to the shared file system.

FIG. 3 and FIG. 4 are flowcharts that illustrate the steps performed by the laptop computer when implementing the shared file system management functionality according to the present invention.

In step 302, the change file is created. This may be accomplished, for example, by the native operating system providing a space in memory (e.g. volatile or non-volatile) to act as the change file. The memory space is typically formed during power up of the laptop computer, but may be generated during any period that the native operating system is active and has control over the laptop computer.

In step 304, the updated information is written to the change file. This may be accomplished, for example, by the non-native operating system becoming active, for example, through the issuance of a resume or start command, and the corresponding virtual file system driver converting or mapping the changes to a particular file (e.g. a text file) made by the non-native operating system application to a format recognizable b the native operating system by passing at least the following parameters to the change file: <file name>, <location offset> and <new, updated or modified data>, where <file name> represents the name of the particular new or changed file; <location offset> represents the location from the start of the file name the changes take place; and <data> represents the new file of the file information that has been change or otherwise modified.

In step 305, a determination is made as to whether the file update has been completed. This may be accomplished, for example, by determining whether the contents of the <data> portion of the information has been exhausted or otherwise transferred in its entirety to the change file. If all of the contents have not been transferred, the process returns to step 304. Otherwise, the non-native operating system is placed into a suspend or hibernate state, for example, by receiving an applicable control signal and the process proceeds to step 306.

Referring briefly to FIG. 4, if the change file update step 305 is complete, the process proceeds to step 402, where the file identified in the updated information is retrieved. This may be accomplished, for example, by the native operating system resuming or being made active, and retrieving the identified file from the corresponding location in memory.

Next, in step 404, the contents of the retrieved file are modified or updated as presented in the <data> portion of the updated information. This may be accomplished, for example, by the native operating system or an application running under control of the native operating system, making the prescribed changes, or in the alternative, not making any changes at all. Once the contents of the retrieved file have been modified or updated, the process proceeds to step 306.

Returning to FIG. 3, in step 306, the contents of the change file are written to the shared file system. This may be accomplished, for example, by the native operating system transferring the information present in the change file to the corresponding location(s) within the shared file system. Once the information transfer is complete, the process ends. At this point, the native operating system may remain active and in control of the laptop computer, or the native operating system may be placed into a suspend or hibernate state and laptop computer control is returned to the resumed non-native operating system.

The foregoing detailed description of the invention has been provided for the purposes of illustration and description. Although an exemplary embodiment of the present invention has been described in detail herein with reference to the accompanying drawings, it is to be understood that the invention is not limited to the precise embodiment(s) disclosed, and that various changes and modifications to the invention are possible in light of the above teachings. Accordingly, the scope of the present invention is to be defined by the claims appended hereto.

What is claimed is:

1. A file system updating method, comprising:
 creating a change file to store information that identifies changed portions of one or more resources without identifying unchanged portions of the one or more resources;
 writing, to the change file, update information provided by a first application running on a first operating system, wherein the first operating system does not have control over a shared file system; and
 writing the update information, stored within the change file, to a shared file managed by the shared file system, wherein the update information is written from the change file to the shared file by a second application running on a second operating system, wherein the second operating system is active only when the first operating system is non-active, wherein the second operating system has control over the shared file system, wherein the first operating system and the second operating system are installed on the same electronic device, wherein the change file is created only by the second operating system and is not accessible simultaneously by the first and second operating system; and wherein the first operating system (a) is a different type of operating system than the second operating system and (b) employs a different locking mechanism than the second operating system.

2. The method of claim 1, wherein the update information includes a file name, a location offset, and data identifying a change made to a resource.

3. The method of claim 1, wherein writing the update information, stored within the change file, to a shared file, comprises:

in response to the second operating system entering a suspend or hibernate mode, causing the first operating system to (a) retrieve a file identified by a file name and offset information contained within the change file, (b) modifying the contents of the file to reflect the update information stored within the change file, and (c) storing the update information, associated with the file, within the shared file.

4. The method of claim 1, wherein the first operating system is a different type of operating system than the second operating system.

5. The method of claim 1, wherein the change file is implemented as a file.

6. The method of claim 1, wherein the change file is implemented as a reserved area of the shared file system.

7. A method of updating a shared file system having a principle operating system which has control over the shared file system, comprising:

creating a change memory location to store information that identifies changed portions of one or more resources without identifying unchanged portions of the one or more resources;

an operating system driver, of a secondary operating system, writing, to the change memory location, update information, wherein the secondary operating system does not have control over the shared file system;

retrieving the update information from the change memory location; and an application, executing on the principle operating system, writing the update information, stored in the change memory location, to a shared file system file managed by the shared file system, wherein the first operating system and the second operating system are installed on the same electronic device, wherein the change file is created only by the second operating system and is not accessible simultaneously by the first and second operating system; and wherein the principle operating system (a) is a different type of operating system than the secondary operating system and (b) employs a different locking mechanism than the secondary operating system.

8. The method of claim 7, wherein the update information includes a file name, a location offset, and data identifying a change made to a resource.

9. The method of claim 7, wherein writing the update information, stored in the change memory location, to a shared file system file comprises:

in response to the secondary operating system entering a suspend or hibernate mode, causing the principle operating system to (a) retrieve a file identified by a file name and offset information contained within the change memory location, (b) modifying the contents of the file to reflect the update information stored within the change memory location, and (c) storing the update information, associated with the file, within the shared file system file.

10. The method of claim 7, wherein the principle operating system is a different type of operating system than the secondary operating system.

11. The method of claim 7, wherein the change memory location is a reserved area of non-volatile memory.

12. An electronic device, comprising:

a processor; and a memory coupled to the processor, the memory including a shared file system, a principle operating system, and a secondary operating system, the memory further including instructions that when executed by the processor cause the processor to:

create a change memory location to store information that identifies changed portions of one or more resources without identifying unchanged portions of the one or more resources, write, to the change memory location, update information provided by the secondary operating system, wherein the update information includes a file name, a location offset value, and updated data, retrieve the update information from the change memory location, and write the update information, retrieved from the change memory location, to the shared file system, wherein after the secondary operating system has provided the update information, (a) the secondary operating system is placed into a non-active state and the principle operating system is placed into an active state, and (b) the update information is written to the shared file system by the principle operating system accessing the file identified by the file name and the location offset value, and (c) the contents of the file identified by the file name is updated to include the updated data contained within the update information, wherein the first operating system and the second operating system are installed on the same electronic device, wherein the change file is created only by the second operating system and is not accessible simultaneously by the first and second operating system; and wherein the principle operating system (a) is a different type of operating system than the secondary operating system and (b) employs a different locking mechanism than the secondary operating system.

13. The device of claim 12, wherein the principle operating system is a different type of operating system than the secondary operating system.

14. The device of claim 12, wherein the change memory location is a reserved area of non-volatile memory.

15. The device of claim 12, wherein the secondary operating system is placed into a non-active state by entering a suspend or hibernate mode.

* * * * *